United States Patent [19]

Sarraf

[11] Patent Number: 5,267,243
[45] Date of Patent: Nov. 30, 1993

[54] ACCESS SCHEME FOR A DATA COMMUNICATIONS NETWORK

[75] Inventor: Mohsen Sarraf, Rumson, N.J.

[73] Assignee: AT&T Bell Laboratories, Murray Hill, N.J.

[21] Appl. No.: 864,251

[22] Filed: Apr. 6, 1992

[51] Int. Cl.$^5$ ................................................ H04J 3/16
[52] U.S. Cl. .................................................... 370/95.1
[58] Field of Search .................... 370/85.2, 85.3, 85.4, 370/85.7, 94.1, 94.2, 95.1, 95.3; 178/4.1 C

[56] References Cited

U.S. PATENT DOCUMENTS

| | | | |
|---|---|---|---|
| 1,508,870 | 9/1924 | Bennett | 178/4.1 C |
| 4,689,785 | 8/1987 | Toyonaga et al. | 370/85.3 |
| 4,718,061 | 1/1988 | Turner | 370/89 |
| 4,774,707 | 9/1988 | Raychaudhuri | 370/85.2 |
| 5,012,469 | 4/1991 | Sardana | 370/95.3 |

OTHER PUBLICATIONS

R. Binder, "A Dynamic Packet-Switching System for Satellite Broadcast Channels," *Proceedings of the IEEE International Conference on Communications*, San Francisco, Calif., pp. 41-1 through 41-5, Jun. 16-18, 1975.
T. Berger, N. Mehravari, D. Towsley and J. Wolf, "Random Multiple-Access Communication and Group Testing," *IEEE Transactions on Communications*, vol. COM-32, No. 7, pp. 769-779, Jul. 1984.
M. Sarraf and V. Li, "A Stable Multiple Access Scheme for Satellite Communications Networks", *Proceedings of the IEEE-INFOCOM*, Apr., 1986.
J. F. Hayes, *Modeling and Analysis of Computer Communications Networks* (New York: Plenum Press), 1984, p. 111.
A. S. Tanenbaum, *Computer Networks* (New Jersey: Prentice-Hall, Inc.), 1981, pp. 257-259 303-306.
I. Rubin, "Access-Control Disciplines for Multi-Access Communication Channels: Reservation and TDMA Schemes," *IEEE Transactions on Information Theory*, vol. IT-25, No. 5, Sep. 1979, pp. 516-536.
S. Koubias and G. Papadopoulos, "Presentation of a New Efficient Self-Adaptive Multiple Access Protocol" *Proceedings of MELECON '83*, Mediterranean Electrotechnical Conference, Athens, Greece, May 24-26, 1983, pp. A2.06-A2.07.
S. S. Lam, "Multiple Access Protocols," *Computers Communications*, vol. 1—Principles, Prentice-Hall, Inc., Englewood Cliffs, NJ, 1983, pp. 114-152.
J. E. Wieselthier and A. Ephremides, "Protocols of Multiple Access, (A Survey), and the IFFO Protocols, (A Case Study)" *New Concepts In Multi-User Communication*, edited by J. K. Skwirzynski, NATO Advanced Study Institutes Series, Series E: Applied Sciences, No. 43, Sigthoff & Noordhoff, The Netherlands, 1981.
I. Rubin, "Group Random-Access Disciplines for Multi-Access Broadcast Channels," *IEEE Transactions on Information Theory*, vol. IT-24, No. 5, Sep. 1978, pp. 578-591.
S. A. Koubias and G. D. Papadopoulos, "Further Results on the Performance Evaluation of the Split Channel Reservation Multiple Access Protocol ATP-2 for Local Area Networks," *IEEE Transactions on Computers*, vol. 37, No. 3, Mar. 1988, pp. 376-383.

*Primary Examiner*—Wellington Chin
*Attorney, Agent, or Firm*—David R. Padnes

[57] ABSTRACT

A data communications system wherein a plurality of stations each transmits data messages through a time-shared channel. In one embodiment of the invention, each data message is transmitted in either one of two alternative modes. In the first mode, a station transmits a data message at any time while in the second mode each station is assigned different times to transmit their data messages and transmission by that station is inhibited at other times. The mode of transmission is determined by a number of events. One such event is when a data message is successfully transmitted by a station and within a predetermined time interval thereafter that station has another data message to transmit. In another embodiment of the invention, a station is operative in the above-described first or second modes. The operative mode is modified to maintain a waiting or idle period between two successively transmitted data messages when the first of these two data messages has been successfully transmitted. In the first mode, this waiting period causes transmission of the second of the two successive data messages to be delayed until at least the expiration of the waiting period. In the second mode, this waiting period causes a station to delay transmission at one of its assigned times if such transmission does not maintain the waiting period.

21 Claims, 5 Drawing Sheets

FIG. 1 MULTIPOINT NETWORK 10

ACCESS SCHEME FOR A DATA COMMUNICATIONS NETWORK

TECHNICAL FIELD

This invention relates to a data communications network which utilizes an access scheme to control data traffic generated by a plurality of stations in the network.

BACKGROUND OF THE INVENTION

A data communications network oftentimes includes a plurality of stations which share a common, limited bandwidth channel to communicate with a processor. The processor can be realized by a mainframe computer, a minicomputer, etc. When two or more stations transmit data which overlap in time on the common channel, a collision of data occurs. To avoid or resolve such a collision, an access scheme is typically employed in the data communications network to control the data traffic. Collision resolution typically calls for the "colliding" stations, i.e., those stations whose data transmissions have collided, to retransmit their respective data in an order prescribed by the access scheme.

The performance of a data communications network which utilizes an access scheme is measured in terms of throughput and access delay. Throughput is defined as the percentage of time that data is transmitted "successfully", i.e., without any collision. Access delay is defined as the average time period that particular data remains at a station before successful transmission.

Of the many access schemes, two of the more widely-known ones are the time division multiple access (TDMA) scheme and the ALOHA scheme. In the TDMA scheme, each station transmits only during its preassigned time slots which repeat periodically. (For details on the TDMA scheme, see, for example, J. F. Hayes, *Modeling and Analysis of Computer Communications Networks* (New York: Plenum Press), 1984, page 111, which is hereby incorporated by reference.) Such a scheme provides a high throughput in situations where the data communications traffic is heavy. On the other hand, it imposes an unduly long access delay on the data communications in light traffic situations.

In the ALOHA scheme, each station transmits data whenever the station is ready. When a collision occurs, each colliding station retransmits after a randomized delay. (For details on the ALOHA scheme, see, for example, A. S. Tanenbaum, *Computer Networks* (New Jersey: Prentice-Hall), 1981, pages 257-259, which is hereby incorporated by reference.) In contrast to the TDMA scheme, the ALOHA scheme affords a relatively short access delay in light traffic situations, but an undesirably low throughput in heavy traffic ones.

Many of other access schemes in the prior art are, to some extent, derived from the two aforementioned schemes. Specifically, they mimic the ALOHA scheme in light traffic situations and the TDMA scheme in heavy traffic ones. An example of such an access scheme is described in M. Sarraf and V. Li, "A Stable Multiple Access Scheme for Satellite Communications Networks," *Proceedings of the IEEE-INFOCOM*, April, 1986, which is hereby incorporated by reference. This scheme is hereinafter referred to as the Sarraf and Li scheme. In this scheme, newly generated data in each station is transmitted whenever the station is ready. When a collision occurs, each colliding station retransmits data during its preassigned time slots. Each colliding station also continues to transmit in its preassigned time slots until all of the remaining data in the station has been successfully transmitted. At such time, Each colliding station returns to its previous operational mode where data is transmitted whenever the station is ready.

The Sarraf and Li scheme desirably responds to a continuum of traffic volumes. That is, it continuously adjusts to new traffic conditions so as to effectively maintain a smooth traffic flow. In terms of performance, this scheme imposes a reasonable access delay on the data traffic, but it, nevertheless, provides an undesirably low throughput.

There are, however, other access schemes, for example, the urn protocol and the group testing scheme, which unlike the Sarraf and Li scheme, offer relatively high throughputs in addition to reasonable access delays. The urn protocol and the group testing scheme are respectively discussed in, A. S. Tanenbaum, *Computer Networks* (New Jersey: Prentice-Hall), 1981, pages 303-306; and T. Berger, et al., "Random Multiple-Access Communication and Group Testing," *IEEE Trans. Commun.*, Vol. COM-32, July 1984, pages 769-779; both of which are hereby incorporated by reference. The urn protocol is, however, undesirable in networks where the bandwidth is in significant demand, which is normally the case. Specifically, in order for the urn protocol to operate, each of the stations in the data communications network must be continuously informed of a current estimate of the number of colliding stations to appropriately respond to the traffic condition. This being so, the urn protocol disadvantageously requires a separate subchannel to communicate such estimates to the stations.

The group testing scheme also has shortcomings. One such shortcoming is that it is incapable of responding to a continuum of traffic volumes. Specifically, under the group testing scheme, each station must store an internal table for each traffic volume. Since each station has a limited memory capacity, it can only store a finite number of internal tables. The actual number of internal tables stored, of course, depends on the size of the tables themselves. Furthermore, as is well known, the size of each table varies directly with the number of stations in the data communications network. As such, the group testing scheme can only respond to a finite number of traffic volumes, which number diminishes as the number of stations increases.

In view of the foregoing, it would be desirable to have an access scheme which not only offers a high throughput and a short access delay, but is also easy to implement and is responsive to a continuum of traffic volumes.

SUMMARY OF THE INVENTION

Broadly speaking, the present invention overcomes the limitations of the prior art by increasing the likelihood that communications will be successfully transmitted between stations sharing a common communications channel. In accordance with one aspect of the present invention, each station transmits data messages in either one of two modes. In the first mode, a station may initiate data message transmission at any time. In the second mode, a station may initiate data message transmission at an assigned time and data message transmission is inhibited at other times. Pursuant to the present invention, a station changes from the first to the second mode, if, after the successful transmission of one data message, the station has another data message to transmit within a predetermined time period. In accordance with another aspect of the present invention, each station may be operative in the first or second modes. Advantageously, the operative mode is altered to incorporate an idle waiting or idle period. This waiting period occurs between transmission of first and second successive data message by a station when the first data message is successfully transmitted and within a predetermined time interval thereafter there is a second data message to transmit. In the first mode, this waiting period causes transmission of the second data message to be delayed when it would have been otherwise transmitted, e.g., the data message is ready to transmit and the shared communications channel is idle. In the second mode, the inclusion of the waiting period causes a station to inhibit transmission of a data message at the station's assigned time if such transmission would not maintain the waiting period between this data message and the immediately preceding successfully transmitted data message.

Advantageously, the present invention responds to a continuum of traffic volumes. As disclosed in the preferred embodiment, the inventive access scheme is relatively simple to implement. This scheme also calls for a small additional bandwidth to communicate different traffic conditions to each station. Moreover, the present scheme significantly improves the throughput and access delay. For example, it affords, for all practical purposes, a throughput almost twice as high as the aforementioned Sarraf and Li scheme. As a consequence of the higher throughput, the inventive scheme also yields a shorter access delay than the Sarraf and Li scheme.

DETAILED DESCRIPTION

Figure 1:
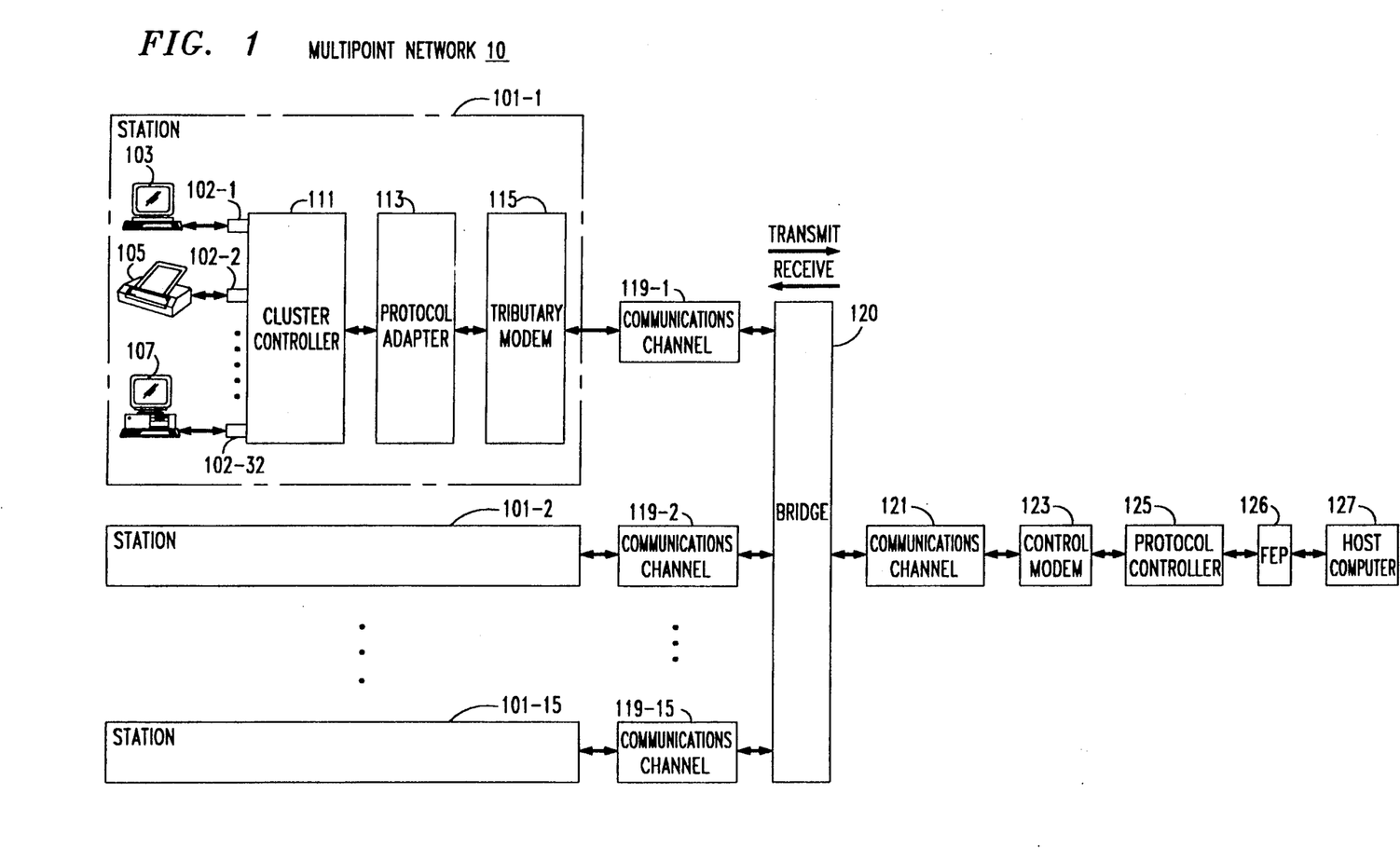
FIG. 1 is a block diagram of a data communications network embodying the principles of the present invention.

FIG. 1 illustrates multipoint network 10 which embodies the principles of the present invention. Multipoint network 10 includes a plurality of stations. By way of example, there are fifteen such stations which are denoted 101-1 through -15 and which are structurally identical to one another. In particular, station 101-1 comprises a plurality of data devices 103, 105 and 107, cluster controller 111, protocol adapter 113 and tributary modem 115. The data devices in each of the stations are configured to communicate with host computer 127 which may be, for example, a mainframe computer.

Cluster controller 111 is of conventional design. Illustratively, the cluster controller in FIG. 1 is that designated as model 3274 and manufactured by International Business Machines, Corp. (IBM). Such a cluster controller has thirty-two interface ports, denoted as 102-1 through -32 with each port supporting a data device. This being so, cluster controller 111 can service up to thirty-two data devices such as a data terminal, a printer and a personal computer. Cluster controller 111 packetizes, in a standard way, individual sequences of data bits received from the data devices. Each data packet, thus created, includes fields that indicate the addresses of the data originating device and the cluster controller connected thereto. The data packets are temporarily stored in buffers in cluster controller 111. At the same time, cluster controller 111 issues to protocol adapter 113 a standard request-to-send signal indicating to the latter that the former has data packets to send.

Protocol adapter 113 runs a random access algorithm which is fully described hereinbelow. This algorithm determines the timing of data packet transmission. Once determined, protocol adapter 113 sends a standard clear-to-send signal to cluster controller 111, thereby acquiring a data packet from the latter. Protocol adapter 113 thereupon processes the acquired data packet and generates a data message, which is described in further detail hereinbelow. This data message contains an identification header, one or more continuation bits as well as the data packet bits. In this illustrative embodiment, there are fifteen such identification headers, each of which is comprised of a plurality of identification bits in a particular pattern. Each bit pattern identifies a particular one of the fifteen cluster controllers in multipoint network 10. Since in this case cluster controller 111 is the one that issues the data packet to protocol adapter 113, the identification header of the data message generated by the latter accordingly has a bit pattern which identifies cluster controller 111. The functionality of the aforementioned continuation bits is also further described hereinbelow. It suffices to know for now that these bits are indicative of the length of the associated data message.

Protocol adapter 113 stores the newly generated data message in a buffer and simultaneously releases a copy thereof to tributary modem 115. Accordingly, tributary modem 115 takes in copies of data messages at a rate of 9.6 kb/s. In a conventional manner, tributary modem 115 transmits a modulated signal representing the data messages over communications channel 119-1 which may be, for example, an analog voice channel.

Like station 101-1, stations 101-2 through -15 separately transmit similarly modulated signals via their respective communications channels 119-2 through -15. The modulated signals transmitted for host computer 117 converge at bridge 120 which is of conventional design. In the transmit direction, bridge 120 principally acts as an adder and, accordingly, generates on communications channel 121 a signal representing the arithmetic sum of the individual modulated signals on channels 119-1 through -15. Channel 121 has a limited bandwidth and provides a common communications link for host computer 127.

Control modem 123 performs an inverse function to a tributary modem. Specifically, control modem 123 demodulates the signal received from communications channel 121 and recovers data messages therefrom. In addition, it provides a master clock signal of 9.6 kHz to the components of multipoint network 10. These components, such as the tributary modem and the protocol adapter of each station, derive their clocks from the master clock signal.

Protocol controller 125 takes in the recovered data messages from control modem 123 and compares each of the identification headers with the fifteen permissible identification headers associated with the fifteen cluster controllers. In a situation where an identification header of a data message is not recognizable as one of the permissible headers, protocol controller 125 discards the data message. This situation arises whenever in accessing channel 121, two or more data messages transmitted from different stations overlap in time at bridge 120. Under this situation, these data messages are said to have "collided" at bridge 120. Since bridge 120 acts as an adder in this instance, individual signals representing the colliding data messages thereby interfere with one another, resulting in a corrupted data message which is received by controller 125. This corrupted data message contains, in particular, an unrecognizable identification header. In response thereto, protocol controller 125 sends a control bit pair having a particular binary value, indicative of the collision, to the protocol adapter of each station. Otherwise, it issues control bit pairs of different binary values to inform the same that no collision occurred. (In this illustrative embodiment, the control bit pair value indicative of a collision is arbitrarily selected to be 11, and its default value is 00.) The way by which each protocol adapter utilizes the control bit pair information is fully described hereinbelow.

For those data messages having recognizable identification headers, protocol controller 125 extracts the underlying data packets from the received data messages and temporarily stores those packets in buffers. In this illustrative embodiment, there are fifteen such buffers, each of which is associated with a particular one of the fifteen cluster controllers. This being so, each data packet is placed in a buffer which corresponds to the cluster controller which its associated identification header identifies.

Moreover, protocol controller 125 responds to the polling initiated by front end processor (FEP) 126. FEP 126 polls, in a sequential manner, all the cluster controllers in the network for any data packet to be communicated to host computer 127. Typically, this polling is communicated to each of the individual cluster controllers. However, by having the polling responded to by protocol controller 125, as in this particular embodiment, it advantageously saves the transit time of the polling signal and the response thereto. This time saving stems from the elimination of the actual trips of the polling and response signals to and from individual cluster controllers through the aforementioned communications channels and modems. This being so, the polling arrangement in this embodiment mitigates the undue access delay which would otherwise be imposed on the communications from each data device to host computer 127.

Protocol controller 125 releases data packets, if any, from the buffer associated with the cluster controller which is polled by FEP 126. The latter is, illustratively, an FEP manufactured by IBM and designated as model 3745. FEP 126 reformats, in a standard way, the data packets received from protocol controller 125 so as to properly present their content to host computer 127. Accordingly, the latter runs various application processes and communicates the results to the appropriate data devices. To this end, FEP 126 packetizes, in a conventional manner, the responses from host computer 127. Protocol controller 125 takes in the data packet bits sequentially and periodically inserts the aforementioned control bit pairs. Protocol controller 125 thereupon provides a bit sequence to control modem 123. The latter transmits the bit sequence over channel 121 at a rate of 9.6 kb/s. In the receive direction, bridge 120 operates in a broadcast mode. That is, after it has received a signal from channel 121, the same signal is communicated to each of stations 101-1 through -15 via, respectively, communications channels 119-1 through -15. The tributary modem of each station demodulates the broadcast signal and recovers the bit sequence therefrom. Each protocol adapter extracts from the recovered bit sequence the previously inserted control bit pairs which indicates thereto the traffic condition of channel 121. The remaining bits in the sequence which are in the form of data packets are provided at the input of each cluster controller. The latter selects from the data packets those that are addressed thereto and sends the selected packets to the appropriate data devices.

Figure 2:
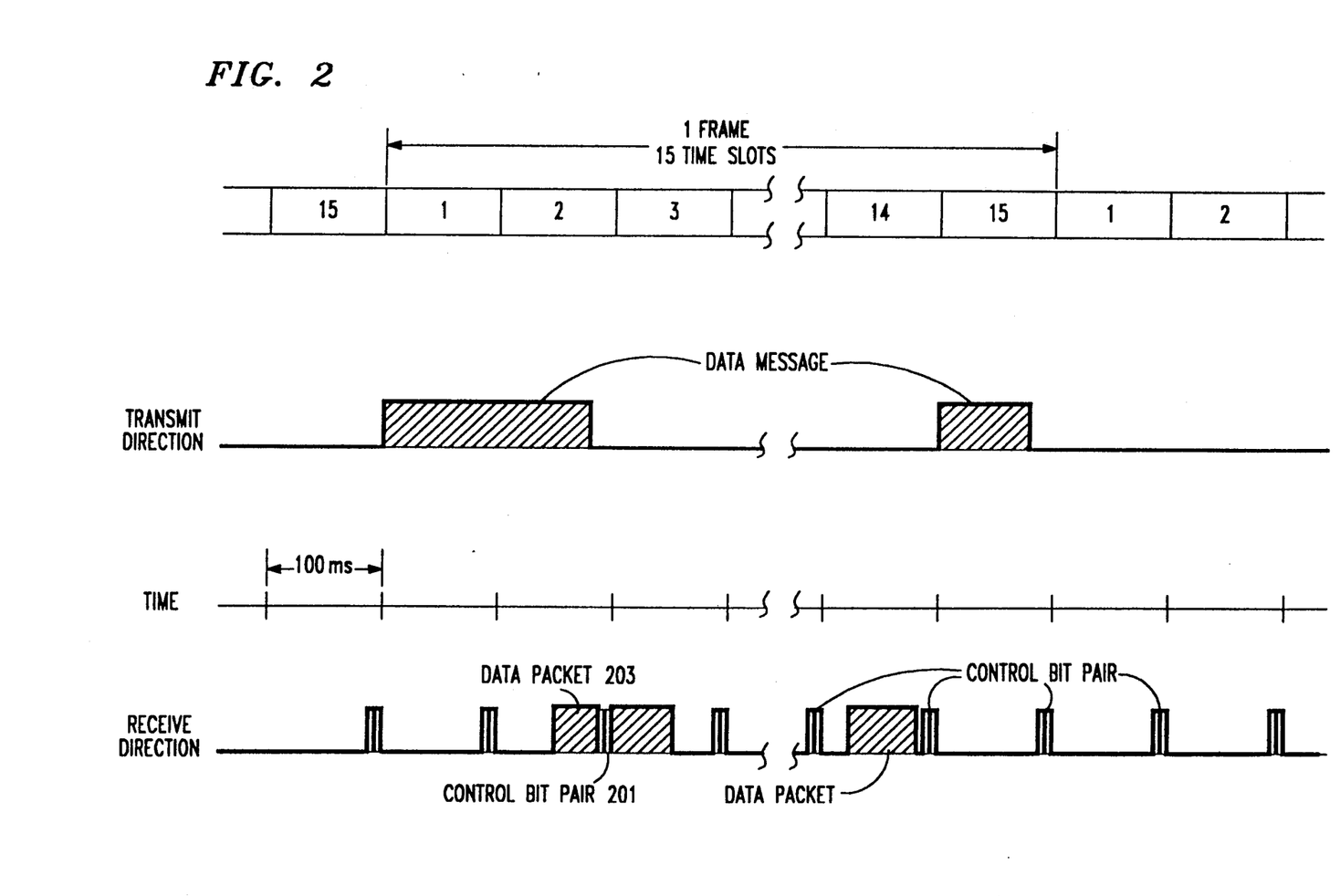
FIG. 2 illustrates the timing of communications traffic on the network of FIG. 1.

FIG. 2 is a timing diagram of the communications traffic on multipoint network 10 in the transmit and receive directions. Specifically, in the transmit direction, time is divided into time slots. Data messages, each having a variable number of bits, are transmitted by a tributary modem at the beginning of a time slot. The duration of a time slot is fixed and is determined based upon the statistical distribution of different lengths of data messages communicated in a particular network. It can be shown that a time slot which is extremely long, with respect to a data message, wastes much of the bandwidth of communications channel 121. On the other hand, an extremely short time slot requires more frequent transmission of the identification header or similar "overhead", resulting in ineffective utilization of the bandwidth. As such, the actual time slot duration is selected so that the bandwidth of channel 121 is effectively utilized. In the present illustrative embodiment, the duration of the time slot is statistically determined to be 960 bits or 960 bits/9.6 kb/s = 100 ms long.

The time slots in FIG. 2 are grouped into frames. Each frame has fifteen time slots which are denoted 1 through 15 as shown in FIG. 2. As described hereinbelow, the aforementioned random access algorithm residing in a protocol adapter may instruct the associated station to transmit in an assigned time slot. If station 101-1 is so instructed, it would accordingly transmit in the upcoming time slot 1 which is assigned to station 101-1 for this purpose; if station 101-2 is so instructed, it would transmit in the upcoming time slot 2; if station 101-3, the upcoming time slot 3 and so on and so forth. The time slots are tracked by each protocol adapter based on its own internal clock (not shown) which is synchronized with the master clock signal provided by control modem 123.

As seen in FIG. 2, in the receive direction, the control bit pairs are periodically inserted by protocol controller 125 into the data packet stream originating from FEP 126. This insertion of control bit pairs may involve breaking data packets apart. The insertion of control bit pair 201 into data packet 203 is such an example. In this illustrative embodiment, the control bit pairs are 100 ms apart and are received by each protocol adapter at a rate of 10 Hz. Each control bit pair is temporally positioned immediately before the end of each time slot. As such, a protocol adapter which causes a data message to be transmitted at the beginning of a time slot can be informed by the received control bit pair at the end of the time slot whether the data message has collided with another data message. The control bit pair can also communicate other ancillary information as will be discussed. If indeed there was a collision, the protocol adapter would be instructed by the random access algorithm therein to immediately cease sending any remaining part of the data message to the associated tributary modem.

Figure 3:
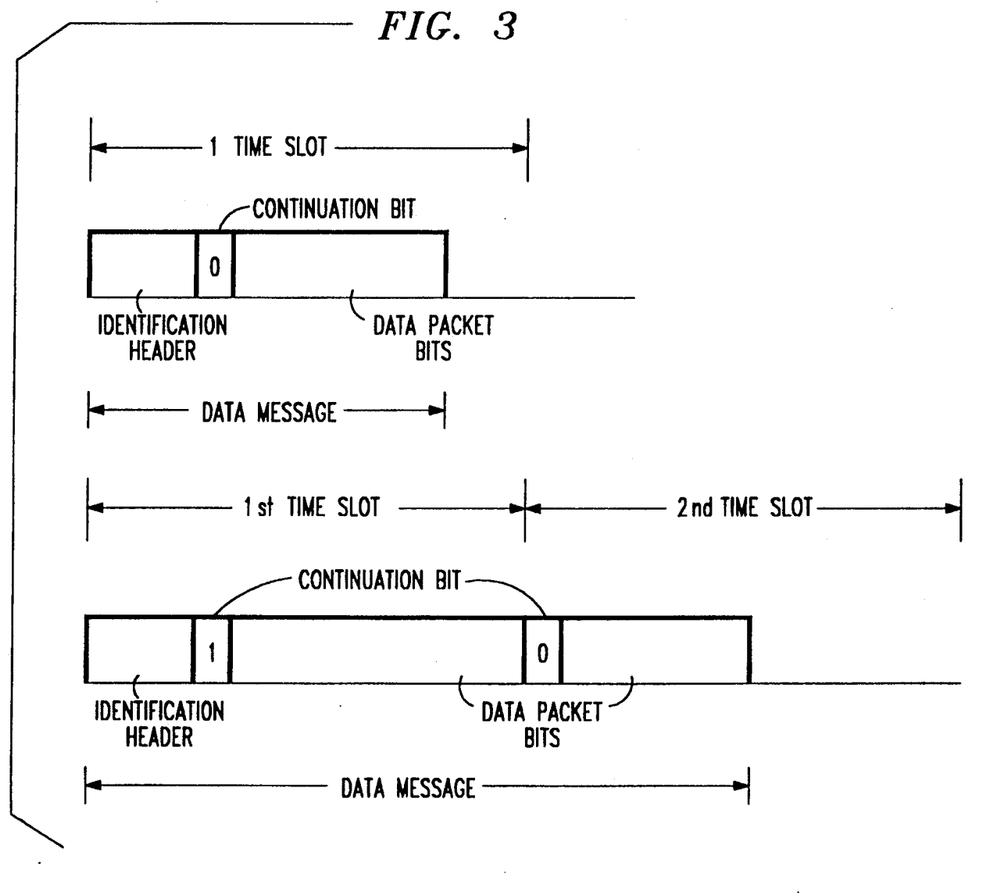
FIG. 3 illustrates the composition of data messages which are communicated over the network of FIG. 1.

Since the data messages are of variable lengths, there is a probability that some data messages are longer than one time slot, and the probability is a function of the selected duration of the time slot. In order for protocol controller 125 to properly assemble a data message in one or more time slots, the data message generated by each protocol adapter provides an indication of its length to controller 125. As shown in FIG. 3, a data message includes in addition to a data packet, an identification header and one or more continuation bits. These continuation bits may be inserted into the packet. Each continuation bit assumes a binary value of 0 or 1. A value of 0 indicates that the data message ends in the current time slot and a value of 1 indicates otherwise. Therefore, when a data message lasts for more than one but no more than two time slots, the first continuation bit has a value of 1 and the second continuation bit has a value of 0. That is, in general, except for the last continuation bit, all of the continuation bits in a data message have a 1 value. It should also be pointed out that the first continuation bit of a data message always immediately follows the identification header. Each subsequent continuation bit for that data message assumes the first bit position at the beginning of the associated time slot.

It should be noted at this point that in addition to the collision information that a protocol adapter needs from protocol controller 125, other information may also be helpful. In this illustrative embodiment, each protocol adapter is also informed whether a particular data message which has successfully accessed channel 121 in a time slot (i.e., without any collision) has any remaining portion occupying one or more succeeding time slots. But for this information, another data message could have been initiated by a second protocol adapter and could have collided with the message portion in the succeeding time slots. In fact, this information is easily provided by protocol controller 125 once it determines that there has been no collision in the current time slot. The provision of such information simply requires protocol controller 125 to further check the value of the currently received continuation bit. If the continuation bit value is 0 which indicates that the received data message is complete, protocol controller 125 accordingly sends a control bit pair of the binary value 10, indicating the same, to individual protocol adapters. Otherwise, if the continuation bit value is 1, protocol controller 125 sends a control bit pair of the binary value 01, indicating that the remaining portion of the data message is to be expected.

Figure 4:
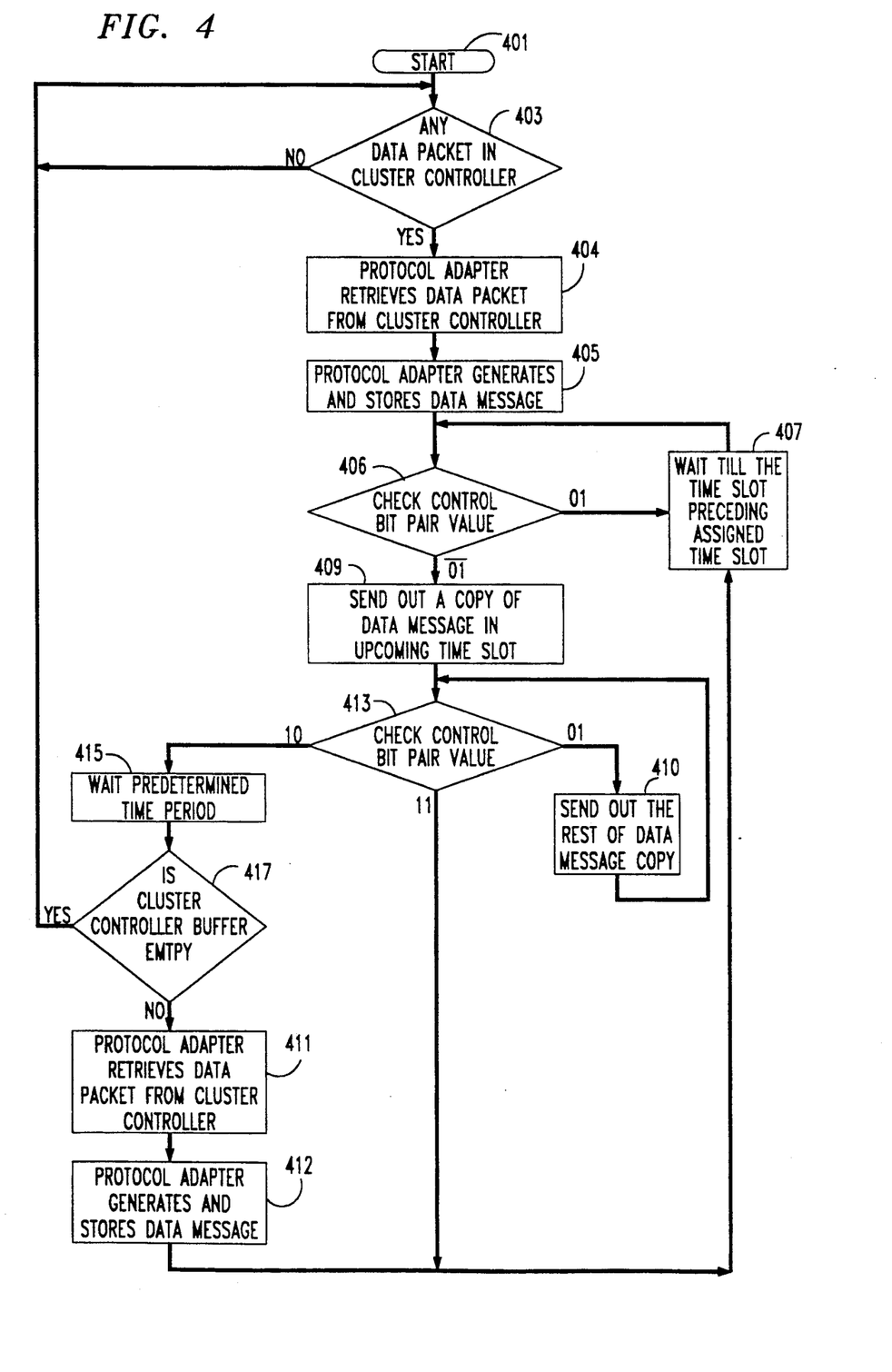
FIG. 4 is a flow chart of an access scheme for controlling data communications traffic on the network of FIG. 1 pursuant to a first embodiment of the present invention.

Turn now to FIG. 4 which shows a flow chart of the aforementioned random access algorithm residing in each protocol adapter of multipoint network 10. As mentioned before, the random access algorithm orchestrates the traffic controlling operation of a protocol adapter. For example, protocol adapter 113 starts to operate, as indicated at 401, at the same time that multipoint network 10 is initially activated. Immediately thereafter, as shown by step 403, protocol adapter 113 monitors cluster controller 111 for any data packet to be sent by the latter. As soon as protocol adapter 113 receives the request-to-send signal from cluster controller 111, the former is instructed by the algorithm to retrieve a data packet from the latter, as indicated at step 404. The random access algorithm thence advances to step 405 wherein protocol adapter 113 generates a data message based upon the retrieved data packet and stores the message in a buffer. The algorithm thereupon proceeds to step 406. At this step, the algorithm checks the value of the upcoming control bit pair received by protocol adapter 113. Assuming for now that this control bit pair value is 01 (i.e., the transmission was successful in the last time slot, but the data message has not yet been completely communicated), the algorithm enters an idle state. In this idle state, protocol adapter 113 is inhibited from sending out any data message copy. Such an idle state persists till the time slot preceding an assigned slot arrives, as indicated at step 407. (Since protocol adapter 113 is in station 101-1, the assigned time slot in this instance is the upcoming time slot 1, i.e., time slot 1 in the immediately following frame.) At such time, the algorithm returns to aforementioned step 406 to recheck the control bit pair value.

Let us assume now that the received control bit pair value at step 406 is not 01, but 11, 10 or 00 instead. In response thereto, the random access algorithm proceeds to step 409. At this step, protocol adapter 113 is instructed to send a copy of the buffered data message to the tributary modem for transmission in the next time slot. After the data message copy has been promptly transmitted, the algorithm checks the control bit pair value as indicated at step 413. If this control bit pair value is 11 (i.e., a collision occurred), the algorithm returns to the aforementioned routine of step 407, followed by step 406.

It should be pointed out at this juncture how random access algorithm reacts to the traffic volume on channel 121 when it, for example, becomes substantially heavy. An initial effect of such an increase in the traffic volume is, of course, that a significant number of collisions occur at bridge 120. In fact, if any protocol adapter checks the control bit pair value during this transition period, the value would most likely be 11. If the protocol adapter continues to send out data messages in such a traffic condition, it would end up performing a routine of steps in the order of 407, 406, 409, 410 and 413 repeatedly, as instructed by its own random access algorithm. A closer look reveals that this routine leads a protocol adapter to initiate data messages only during the time slots assigned to its associated station. This being so, where the traffic is extremely congested, each station tends to initiate its data messages in its assigned time slots. Since each data message could be more than one time slot long, it could occupy one or more succeeding time slots following the assigned slot. Had the data message length been uniformly shorter than or equal to one time slot, this scheme would thus approach the well-known TDMA scheme in an extremely congested traffic condition.

Returning to step 413, let us now assume that the algorithm finds out that the control bit pair value is 01, instead. That is, the data message copy which was sent out by protocol adapter 113 at previous step 409 is longer than one time slot and the first part of the data message copy is successfully received by the other end. Accordingly, the algorithm instructs protocol adapter 113 to continue to send out the rest of the data message copy until its end, as indicated at step 410. Otherwise, if the received control bit pair value is 10 (i.e., the transmission in the last time slot was successful, and the data message was completely communicated), the random access algorithm enters an idle state for a predetermined period of time in accordance with the present invention. Such an idle period is advantageously at least one time slot. The algorithm thence proceeds to step 417 wherein protocol adapter 113 is instructed to check whether the buffer of cluster controller 111 has no more data packets to send. If so, the algorithm returns to aforementioned step 403 where protocol adapter 113 keeps monitoring the cluster controller for any data packet to be sent from the latter. Otherwise, the algorithm performs step 411 and then step 412, which are identical to, respectively, aforementioned step 404 and step 405. As required by steps 411 and 412, protocol adapter 113 retrieves a data packet from cluster controller 111, generates a data message based thereon and stores the message in a buffer. Thereafter, the algorithm returns to step 407 as described before.

Figure 5:
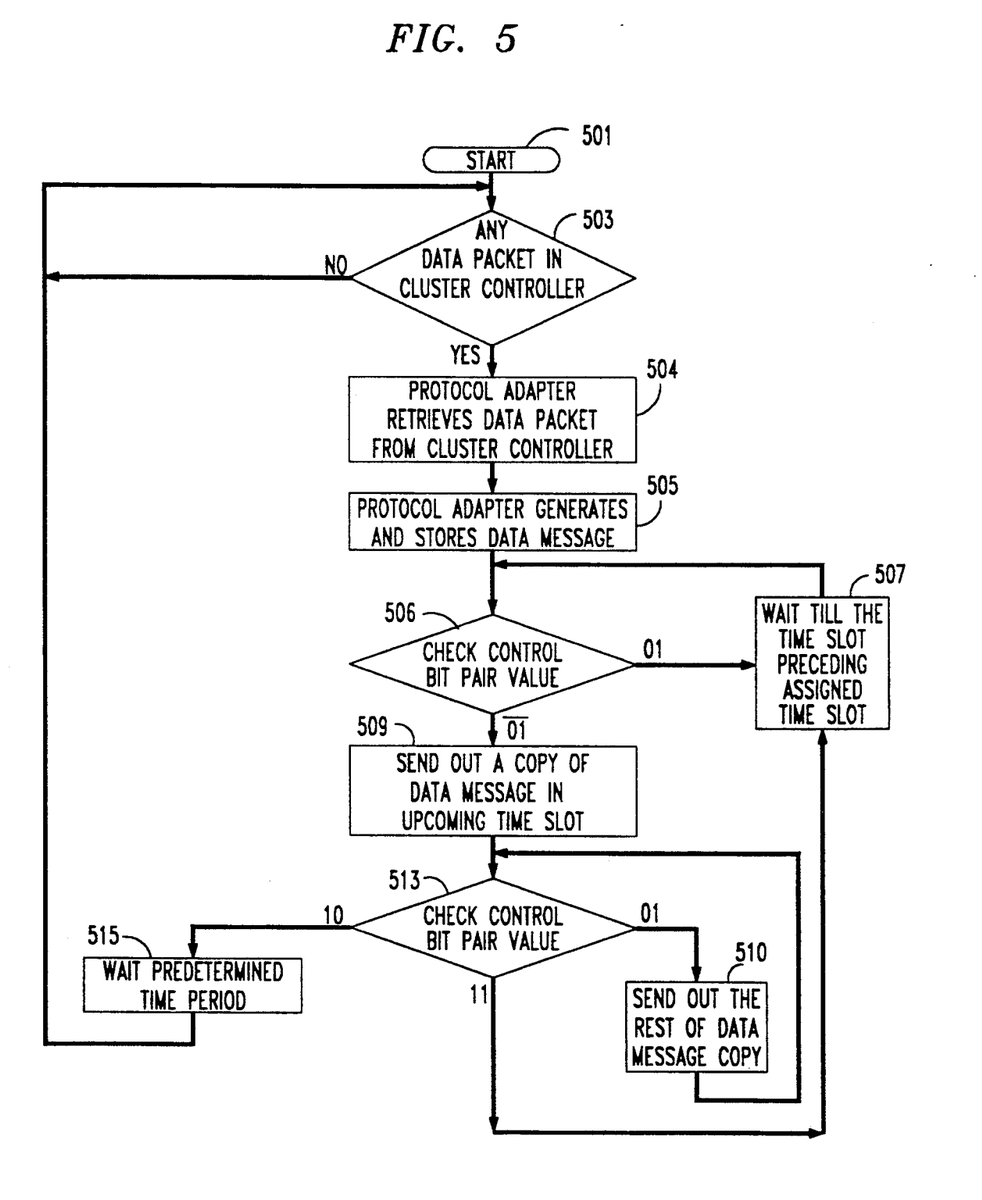
FIG. 5 is a flow chart of an access scheme for controlling data communications traffic on the network of FIG. 1 pursuant to a second embodiment of the present invention.

Turn now to FIG. 5 which shows an alternative means of implementing the aforementioned random access algorithm residing in each protocol adapter of multipoint network 10. In this case, the protocol adapter 113 starts to operate as indicated at 501, at the same time that multipoint network 10 is initially activated. Steps 501, 503, 504, 505 and 506 in the flow chart of FIG. 5 are respectively identical to steps 401, 403, 404, 405 and 406 in FIG. 4. At step 506, if the control bit pair value received by the protocol adapter 113 is 01, the protocol adapter proceeds to step 507 and thence back to step 506, so as to recheck the control bit pair value. However, if the control bit pair value is not 01, the protocol adapter proceeds to step 509 and thence to step 513. At step 513, the value of the control bit pair is checked and, depending on this value, the protocol adapter proceeds to step 515, 507 or 510. These steps are again identical to steps 415, 407 and 410 of FIG. 4. In step 515, however, the protocol adapter 113 inhibits any transmission for a predetermined time period, even if the protocol adapter has more data messages ready for transmission, when the immediately prior message was successfully transmitted. After this predetermined time period, which advantageously is at least one time slot but in any event is substantially greater than the time interval from the end of a data message to the next upcoming time slot, the protocol adapter proceeds back to step 503, where the cluster controller is examined for the presence of data messages and the process starts anew. Now, consider a scenario in which the protocol adapter 113 has a lot of messages to transmit, but others do not have any messages to transmit. In this case, the protocol adapter 113 will follow the routine of steps 503, 504, 505, 506, 509, 513, 510, 513 and 515 repeatedly. Consequently, successively transmitted messages will be separated by a one time slot interval.

The foregoing merely illustrates the principles of the present invention. It will thus be appreciated that those skilled in the art will be able to devise numerous other arrangements which embody the principles of the invention and are thus within its spirit and scope.

For example, although the access scheme disclosed herein requires a feedback in the form of control bit pairs from the protocol controller to all of the transmitting stations, such a feedback is not necessary in a communications network where a transmitting station can monitor the channel, for example, a radio channel, and determine the traffic condition. In addition, the access scheme disclosed herein utilizes time slots which are grouped in frames and where the time slots in every frame are assigned to the stations in a fixed manner. Specifically in this instance, time slot 1 in each frame is assigned to station 101-1, time slot 2 to station 101-2 and so on and so forth. However, this assignment is not necessarily so fixed. Depending on the application, it may be desirable to vary the time slot assigned to each station from one frame to another or periodically. Moreover, although the time slots are of a fixed duration, the disclosed access scheme can also be implemented with time slots of variable durations or without the time-slot requirement at all.

Finally, although the disclosed network is embodied in the form of various discrete electronic building blocks and components, the invention could equally as well be embodied in a system in which the functions of any one or more of those building blocks and components or indeed, all of the functions thereof, are realized, for example, by one or more appropriately programmed processors.

I claim:

1. Signal transmitting apparatus comprising
   means for transmitting a data message, initiation of transmission of said data message being at a first assigned time and being inhibited at other times;
   means for recognizing whether said data message has been successfully transmitted; and
   said transmitting means initiating transmission of another data message following said data message at a second assigned time and inhibiting initiation of transmission at other times, said transmitting means also inhibiting initiation of transmission of said another data message at said second assigned time upon recognition that said data message has been successfully transmitted and transmission initiation at said second assigned time would not maintain a predetermined nonzero time interval between said data message and said another data message.

2. The apparatus of claim 1 wherein said data message and said another data message have different lengths.

3. The apparatus of claim 1 wherein said data message and said another data message have the same length.

4. The apparatus of claim 1 wherein said data message and said another data message each includes a portion which identifies said signal transmitting apparatus.

5. A method for use in a communications system comprising the steps of
   transmitting a data message, initiation of transmission of said data message being at a first assigned time and being inhibited at other times;
   recognizing whether said data message has been successfully transmitted; and
   initiating transmission of another data message following said data message at a second assigned time and inhibiting transmission initiation at other times, and also inhibiting initiation of transmission of said another data message at said second assigned time upon recognition that said data message has been successfully transmitted and transmission initiation at said second assigned time would not maintain a predetermined nonzero time interval between said data message and said another data message.

6. Apparatus for use in a communication system comprising
   means for transmitting a succession of arriving data messages, each data message being transmitted in one of first and second alternative modes, in said first mode said transmitting means initiating transmission of one data message in said succession at any time and in said second mode said transmitting means initiating transmission of said one data message at an assigned time and inhibiting transmission at other times, said transmitting means being operative to transmit a first data message in said succession in said first mode, means for recognizing whether said first data message has been successfully transmitted, and said transmitting means being operative in said second mode for transmission of a second data message which follows said first data message in response to a recognition that said first data message has been successfully transmitted and within a predetermined time interval after such recognition said transmitting means has said second data message to transmit and said transmitting means being operative in said first mode for transmission of said second data message in response to said recognition that said first data message has been successfully transmitted and within said predetermined time period said transmitting means does not have said second data message to transmit.

7. The apparatus of claim 6 wherein said predetermined time interval is greater than zero.

8. The apparatus of claim 6 wherein said predetermined time interval is zero.

9. The apparatus of claim 6 wherein each of said data messages has a variable length.

10. The apparatus of claim 6 wherein each of said data messages has the same length.

11. The apparatus of claim 6 wherein each of said data messages includes a portion which identifies said apparatus.

12. The apparatus of claim 6 further including means for defining a plurality of successive time intervals and wherein, in said first mode, transmission of said one data message is in any of said defined time intervals and, in said second mode, said assigned time is a subset of said defined time intervals.

13. The apparatus of claim 6 wherein said recognizing means also recognizes whether said first data message has been unsuccessfully transmitted and said transmitting means transmits said second data message in said second mode when said first data message has been unsuccessfully transmitted.

14. A communications system having a common communications channel and a plurality of stations connected thereto, each station comprising means for transmitting a succession of arriving data messages, each data message being transmitted in one of first and second alternative modes, in said first mode said transmitting means initiating transmission of one data message in said succession at any time and in said second mode said transmitting means initiating transmission of said one data message at an assigned time and inhibiting transmission at other times, said transmitting means being operative to transmit a first data message in said first mode, means for recognizing whether said first data message has been successfully transmitted, and said transmitting means being operative in said second mode for transmission of a second data message which follows said first data message in response to a recognition that said first data message has been successfully transmitted and within a predetermined time interval after such recognition said transmitting means has said second data message to transmit, and said transmitting means being operative in said first mode for transmission of said second data message in response to said recognition that said first data message has been successfully transmitted and within said predetermined time period said transmitting means does not have said second data message to transmit.

15. Signal transmitting apparatus comprising means for transmitting a data message at any time;

means for recognizing said data message has been successfully transmitted; and said transmitting means transmitting another data message following said data message at any time after expiration of a predetermined nonzero time interval when said data message has been successfully transmitted, said predetermined time interval commencing after recognition of the successful transmission of said data message.

16. The apparatus of claim 15 wherein said recognizing means also recognizes whether said data message has been unsuccessfully transmitted and said transmitting means transmits said another data message at an assigned time and inhibits transmission at other times in response to a recognition that said data message has been unsuccessfully transmitted.

17. The apparatus of claim 15 wherein said data message and said another data message have different lengths.

18. The apparatus of claim 15 wherein said data message and said another data message have the same length.

19. The apparatus of claim 15 wherein said data message and said another data message each includes a portion which identifies said signal transmitting apparatus.

20. A method for use in a communications system comprising the steps transmitting a succession of received data messages, each data message being transmitted after receipt in one of first and second alternative modes, in said first mode said transmitting means initiating transmission of a data message in said succession at any time and in said second mode said transmitting means initiating transmission of said data message at an assigned time and inhibiting transmission at other times, said transmitting step being operative to transmit a first data message in said succession in said first mode, recognizing whether said first data message has been successfully transmitted, transmitting, in said second mode, a second data message which follows said first data message in response to a recognition that said first data message has been successfully transmitted and within a predetermined time interval after such recognition said second data message has been received, and transmitting, in said first mode, said second data message in response to a recognition that said first data message has been successfully transmitted and within said predetermined time interval after such recognition said second data message has not been received.

21. A method for use in a communications system comprising the steps of transmitting a data message at any time;
recognizing whether said data message has been successfully transmitted; and
transmitting another data message following said data message at any time after expiration of a predetermined non-zero time interval when said data message has been successfully transmitted, said predetermined time interval commencing after recognition of the successful transmission of said data message.

* * * * *